United States Patent
Hoole et al.

(10) Patent No.: US 11,800,498 B2
(45) Date of Patent: Oct. 24, 2023

(54) LOGICAL CONTROL CHANNELS AND IMPLEMENTATION IN A NETWORK

(71) Applicant: Charter Communications Operating, LLC, St. Louis, MO (US)

(72) Inventors: Elliott D. Hoole, Parker, CO (US); Diwelawatte P. Jayawardene, Aurora, CO (US); Manish Jindal, Plano, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 148 days.

(21) Appl. No.: 17/188,347

(22) Filed: Mar. 1, 2021

(65) Prior Publication Data
US 2022/0279512 A1 Sep. 1, 2022

(51) Int. Cl.
*H04W 72/0446* (2023.01)
*H04W 72/20* (2023.01)

(52) U.S. Cl.
CPC ....... *H04W 72/0446* (2013.01); *H04W 72/20* (2023.01)

(58) Field of Classification Search
CPC ..................... H04W 72/0446; H04W 72/0406
See application file for complete search history.

(56) References Cited

U.S. PATENT DOCUMENTS

| | | |
|---|---|---|
| 6,542,739 B1 | 4/2003 | Garner |
| 7,581,012 B2 | 8/2009 | Shiouchi et al. |
| 8,880,071 B2 | 11/2014 | Taaghol et al. |

(Continued)

FOREIGN PATENT DOCUMENTS

| | | |
|---|---|---|
| KR | 20160097917 A | 8/2016 |
| WO | 2004045125 A2 | 5/2004 |

OTHER PUBLICATIONS

Deering, S., et al., "Internet Protocol, Version 6 (IPv6) Specification", Internet Engineering Task Force (IETF), Dec. 1998, 39 Pages.

(Continued)

*Primary Examiner* — Raj Jain
(74) *Attorney, Agent, or Firm* — Armis IP Law, LLC

(57) ABSTRACT

A communication management resource (such as disposed at a network management node or other location) allocates bandwidth in a physical communication link to convey communication data associated with first customer premises equipment. In one implementation, the allocated bandwidth in the physical communication link is partitioned in accordance with wireless bandwidth supported by the first customer premises equipment. For example, in one embodiment, the allocated bandwidth of the physical communication link is mapped to convey corresponding data communicated over wireless bandwidth used by the first customer premises equipment. The communication management resource establishes a control channel over the physical communication link between the network management node and the first customer premises equipment. Via the control channel, the communication management resource then transmits a command over the control channel from the network management node to the first customer premises equipment. The command controls operation of the first customer premises equipment.

28 Claims, 10 Drawing Sheets

(56) References Cited

U.S. PATENT DOCUMENTS

| | | | |
|---|---|---|---|
| 2005/0063317 | A1 | 3/2005 | Risberg et al. |
| 2008/0049614 | A1* | 2/2008 | Briscoe ............... H04L 41/5022 370/230 |
| 2016/0013855 | A1 | 1/2016 | Campos et al. |
| 2016/0073344 | A1 | 3/2016 | Vutukuri et al. |
| 2016/0094421 | A1 | 3/2016 | Bali et al. |
| 2016/0128072 | A1 | 5/2016 | Rajagopal et al. |
| 2016/0259923 | A1 | 9/2016 | Papa et al. |
| 2018/0343685 | A1 | 11/2018 | Hart et al. |
| 2018/0351809 | A1 | 12/2018 | Meredith et al. |
| 2019/0109643 | A1 | 4/2019 | Campos et al. |
| 2019/0124572 | A1 | 4/2019 | Park et al. |
| 2019/0124696 | A1 | 4/2019 | Islam et al. |
| 2019/0190808 | A1* | 6/2019 | Jordan ............... H04L 43/0876 |
| 2019/0319814 | A1 | 10/2019 | Das |
| 2019/0319858 | A1 | 10/2019 | Das et al. |
| 2019/0320250 | A1 | 10/2019 | Hoole et al. |
| 2019/0320322 | A1 | 10/2019 | Jayawardene et al. |
| 2019/0320494 | A1 | 10/2019 | Jayawardene et al. |
| 2019/0349848 | A1 | 11/2019 | Bali |
| 2019/0379455 | A1 | 12/2019 | Wang et al. |
| 2020/0214065 | A1 | 7/2020 | Tomala et al. |
| 2020/0382426 | A1* | 12/2020 | Li ............................ H04L 47/32 |
| 2022/0279512 | A1* | 9/2022 | Hoole ............... H04W 72/0446 |

OTHER PUBLICATIONS

IEEE Std. 802.111, Information Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN Dec. 6, 2017, 250 Pages, Part I.

IEEE Std. 802.111, Information Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN Dec. 6, 2017, 209 Pages, Part II.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 Pages.

Wi-Fi Direct (including "W-Fi Peer-to-Peer (P2P) Specification"), copyright 2014, Wi-Fi Alliance, 90 Pages, Part I.

Wi-Fi Direct (including "Wi-Fi Peer-to-Peer (P2P) Specification"), copyright 2014, Wi-Fi Alliance, 93 Pages, Part II.

"Internet Protocol, DARPA Internet Program, Protocol Specification", IETF RCF 791, Sep. 1981, 50 pages.

FCC Consumer Guideline regarding signal leakage, printed Jan. 29, 2021 fromhttps://www.fcc.gov/consumers/guides/cable-signal-leakage, 2 Pages.

IEEE P802.11ax™/D7.0 Draft Information for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency 28 WLAN, Prepared by the 802.11 Working Group of the LAN/MAN Standards Committee of the IEEE Computer Society, Copyright © 2020 by the IEEE, Sep. 2020, pp. 1-822.

IEEE P802.11ax™/D6.0, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Prepared by the 802.11 Working Group of the LAN/MAN Standards Committee of the IEEE Computer Society Copyright © 2019 by the IEEE, Nov. 2019, pp. 1-780.

\* cited by examiner

LOGICAL CONTROL CHANNELS AND IMPLEMENTATION IN A NETWORK

BACKGROUND

Conventional hardwired cables have been used to provide cable television and over-the-top services to households for quite some time. For example, it is quite common for a household to include customer premises equipment or a wireless access point (such as based on Wi-Fi™) to provide users in the respective household access (via the over-the-top services) to a remote network via a communication path including a wireless communication link between an end user device to the customer premises equipment (wireless access point). The customer premises equipment provides connectivity through the hardwired cable to the remote network.

BRIEF DESCRIPTION OF EMBODIMENTS

Conventional techniques of providing connectivity of a subscriber domain and end users to a remote network via customer premises equipment suffer from deficiencies. For example, a bandwidth provided by a hardwired cable may provide enhanced data flow from a customer premises equipment to a remote network. However, there is a need to provide control of downstream instances of customer premises equipment.

Embodiments herein include providing improved techniques of providing control of connectivity (such as supporting messaging) between a respective network management node and one or more instances of customer premises equipment in a wireless network environment.

More specifically, a communication management resource (such as disposed at a network management node or other location) allocates (implements) bandwidth in a physical communication link to convey communication data associated with first customer premises equipment. In one implementation, the allocated bandwidth in the physical communication link is partitioned in accordance with wireless bandwidth supported by the first customer premises equipment. For example, in one embodiment, the allocated bandwidth of the physical communication link is partitioned based on wireless bandwidth supported by the first customer premises equipment. To provide control of downstream instances of customer premises equipment, the communication management resource in the network management node establishes a control channel over the physical communication link between the network management node and at least the first customer premises equipment. Via the control channel, the communication management resource then transmits one or more messages such including a command over the control channel from the network management node to the first customer premises equipment. The command controls operation of the first customer premises equipment.

In further example embodiments, the communication link is bidirectional, enabling the first customer premises equipment to communicate in an upstream to the network management node.

In yet further example embodiments, in response to communicating a control command over the control channel to the first customer premises equipment, the communication management resource at the network management node receives corresponding one or more reply communications from the first customer premises equipment communications over the control channel.

Further embodiments herein include, via the communication management resource, allocating a first sub-band and a second sub-band in the physical communication link. The first sub-band is allocated to convey data corresponding to first wireless bandwidth used by the first customer premises equipment to communicate with multiple wireless stations (such as communication devices). Second sub-band is allocated in the physical communication link; the second sub-band is allocated to convey corresponding second wireless bandwidth used by the first customer premises equipment to communicate with the multiple wireless stations.

Depending on the embodiment, the control channel can be established in any suitable band of the physical communication link. For example, in one embodiment, the communication management resource of the network management node establishes the control channel in a first sub-band or second sub-band, each of which supports conveyance associated with wireless bandwidth implemented by the first customer premises equipment.

Additionally, or alternatively, the communication management resource establishes the control channel in a third sub-band (such as 5-85 MHz or 902-928 MHz disposed between the first sub-band and the second sub-band as previously discussed). In one embodiment, the third sub-band does not convey corresponding wireless bandwidth supported by the first customer premises equipment and is reserved for other use.

As previously discussed, the communication management resource communicates one or more messages such as control commands over the control channel to control operation of the first customer premises equipment. The control messages can be configured to control any suitable function of the network management node. For example, in one embodiment, the one or more control commands notify the first customer premises equipment of a wireless power level at which to transmit wireless communications from the first customer premises equipment to one or more communication devices in a respective subscriber domain in which the first customer premises equipment resides. Thus, as its name suggests, the control channel can be used for control purposes.

In a reverse direction, the communication management resource associated with the network management node can be configured to receive and monitor the first customer premises equipment. Thus, messaging over the control channel can be used for monitoring purposes.

In accordance with further example embodiments, the communication management resource associated with the network management node establishes the control channel over the physical communication link between the network management node and multiple instances of customer premises equipment including the first customer premises equipment and one or more instances of other customer premises equipment. The control channel can be of any type such as selected from the group including: a unicast link, a multicast link, a broadcast link, etc. Thus, via point to point (individual) control channel connectivity to each instance of customer premises equipment, the communication management resource of the network management node communicates (via unicast) secured messages to each of the target instances of customer premises equipment.

Conversely, via point to multipoint control channel connectivity from the network management node to multiple instances of customer premises equipment, the communication management resource of the network management node communicates (via multicast or broadcast) secured messages to a grouping of multiple instances of customer premises equipment.

In still further example embodiments, the allocated bandwidth (and corresponding sub-bands) in the physical communication link is allocated to convey data corresponding to each of multiple antennas (such as a first antenna, a second antenna, a third antenna, etc.) associated with the first customer premises equipment and potentially other instances of customer premises equipment.

More specifically, a first antenna of the first customer premises equipment can be configured to support wireless communications in a first wireless band; the shared communication link includes a first sub-band to convey data associated with the first wireless band. A second antenna of the first customer premises equipment can be configured to support wireless communications in a second wireless band; the shared communication link includes a second sub-band to convey data associated with the first wireless band. A third antenna of the first customer premises equipment can be configured to support wireless communications in a third wireless band; the shared communication link includes a third sub-band to convey data associated with the third wireless band. A fourth antenna of the first customer premises equipment can be configured to support wireless communications in a fourth wireless band; the shared communication link includes a fourth sub-band to convey data associated with the fourth wireless band.

Thus, allocation of bandwidth in the physical communication link (a.k.a., shared communication link) can be configured to includes: allocation of a first sub-band in the physical communication link, the first sub-band being allocated to convey data wirelessly received over a first antenna of the first customer premises equipment; allocation of a second sub-band in the physical communication link, the second sub-band being allocated to convey data wirelessly received over a second antenna of the first customer premises equipment, and so on.

Still further example embodiments herein include allocating a first sub-band in the physical communication link, the first sub-band being allocated to convey first data (such as downstream) from the network management node to the first customer premises equipment for subsequent wireless transmission of the first data over a first antenna of the first customer premises equipment; and allocating a second sub-band in the physical communication link, the second sub-band being allocated to convey second data (such as downstream) from the network management node to the first customer premises equipment for wireless transmission of the second data over a second antenna of the first customer premises equipment, and so on. As previously discussed, each of the multiple sub-bands can be configured to support upstream communications as well.

Embodiments herein of implementing control channel establishment and use are useful over conventional techniques. For example, embodiments herein provide a unique way of controlling operation of one or more instances of customer premises equipment in a network environment to provide more efficient use of wired and wireless services.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate location detection and allocation of one or more wireless channels in a network environment. The instructions, when executed by computer processor hardware, cause the computer processor hardware (such as one or more co-located or disparately processor devices or hardware) to: allocate bandwidth in a physical communication link to convey communication data associated with first customer premises equipment, the allocated bandwidth partitioned based on wireless bandwidth used by the first customer premises equipment; establish a control channel over the physical communication link; and communicate a command over the control channel from a network management node to the first customer premises equipment, the command controlling operation of the first customer premises equipment.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
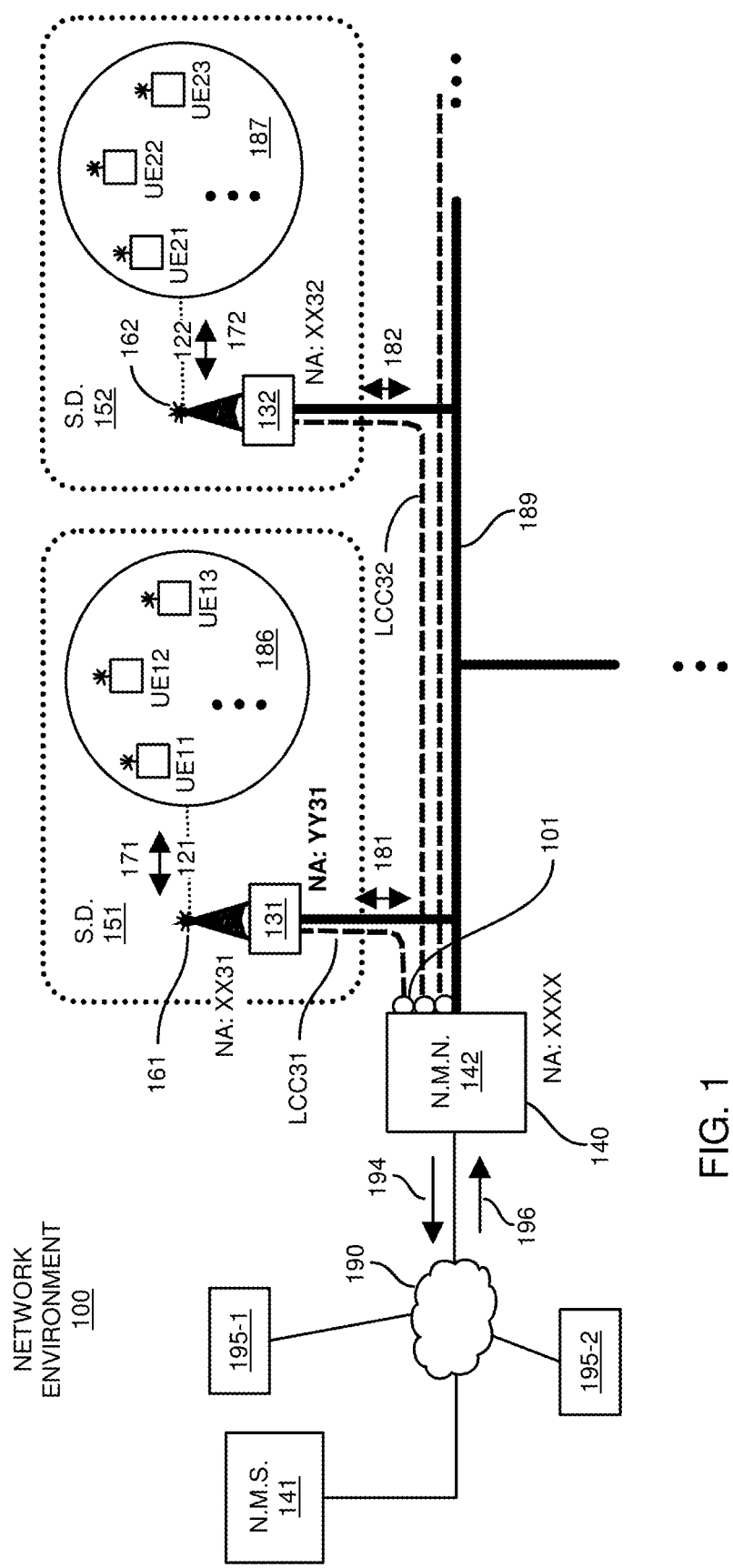
FIG. 1 is an example diagram illustrating a communication environment and respective interconnectivity of devices according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A communication management resource (such as communication management hardware or communication management software disposed at a network management node or other location) allocates (i.e., implements use of) bandwidth in a physical communication link to convey communication data associated with at least first customer premises equipment. In one implementation, the allocated bandwidth in the physical communication link is partitioned in accordance with wireless bandwidth supported by the first customer premises equipment. To provide better use of the wireless system, the communication management resource establishes a control channel over the physical communication link between the network management node and at least the first customer premises equipment and potentially other instances of customer premises equipment.

Note that the control channel amongst the partitioned bandwidth can be implemented in any suitable manner. For example, the control channel can be implemented via a dedicated band in the physical communication link. Alternatively, the control channel can be implemented in a sub-band of the available bandwidth that supports conveyance of data associated with wireless communications. For example, the physical communication link supports downstream communication of data that is wirelessly communicated by the customer premises equipment to respective communication devices. The customer premises equipment receives wireless communications from the communication devices and communicates such information upstream through the physical communication link to the network management node.

Via implementation of the control channel, the communication management resource associated with the network management node communicates one or more messages such as including a command over the control channel from the network management node to the first customer premises equipment. The command controls operation of the first customer premises equipment. As further discussed herein, the control channel supports upstream communications as well.

Now, more specifically, with reference to the drawings, FIG. 1 is an example diagram illustrating a communication network environment and respective support of connectivity according to embodiments herein.

As shown, network environment 100 includes multiple disparately located instances of customer premises equipment such as customer premises equipment 131 (assigned network address or MAC address of XX31) disposed in subscriber domain 151; customer premises equipment 132 disposed in subscriber domain 152 (assigned network address or MAC address of XX32); and so on.

Network environment 100 further includes network 190, network management system 141, server resources 195-1 (such as a content distribution resource), server resource 195-2 (such as a content distribution resource), etc., network management node 142. Communication management resource 140 is associated with or disposed at network management node 142.

Note that any of the components in network environment 100 can be instantiated in a suitable manner. For example, the customer premises equipment 131 can be implemented as customer premises equipment hardware, customer premises equipment software, or a combination of customer premises equipment hardware and customer premises equipment software; network management system 141 can be implemented as network management system hardware, network management system software, or a combination of network management system hardware and network management system software; each instance of network management node 142 can be implemented as network management node hardware, network management node software, or a combination of network management node hardware and network management node software; wireless stations (such as UE11, UE12, . . . UE21, UE22, . . . ) can be implemented as wireless station hardware, wireless station software, or a combination of wireless station hardware and wireless station software; and so on.

Note that each instance of customer premises equipment in the network environment 100 includes antenna hardware providing connectivity to respective one or more instances of communication devices.

Further in this example embodiment, the customer premises equipment 131 includes antenna hardware 161 (such as one or more antennas) to communicate with respective wireless stations (or user equipment) UE11, UE12, UE13, etc. For example, via respective wireless connectivity 121, the customer premises equipment 131 communicates with (such as receives communications from and transmits communications to) the different instances of wireless stations UE11, UE12, UE13, etc.

Each subscriber domain and corresponding instance of customer premises equipment in network environment 100 operate in a similar manner. For example, the customer premises equipment 132 includes antenna hardware 162 (such as one or more antennas) to communicate with respective wireless stations UE21, UE22, UE23, etc. Via respective wireless connectivity 122, the customer premises equipment 132 communicates with (such as receives communications from and transmits communications to) the different instances of wireless stations UE11, UE12, UE13, etc.

In one embodiment, as previously discussed, the wireless stations (UEs) are also known as user equipment, wireless communication devices, mobile communication devices, etc., supporting respective users (operators) wireless connectivity to the remote 190 such as the Internet or other content distribution network.

As further shown, each of the instances of customer premises equipment provides one or more wireless stations (such as user equipment) wireless connectivity and corresponding access to remote network 190 through the physical communication link 189 (such as shared communication link).

For example, via connectivity 121, wireless stations UE11 establishes a respective wireless communication link with the customer premises equipment 131. The wireless station UE11 transmits wireless communications 171 to the customer premises equipment 131. The customer premises equipment 131 converts the received wireless communications 171 into respective one or more communications 181 transmitted from the respective customer premises equipment 131 over physical communication link 189 (such as coaxial cable or other suitable entity) and corresponding allocated bandwidth to network management node 142. Network management node 142 converts and forwards the received communications 181 into communications 194 communicated to an appropriate one or more target server resources 195 (such as server resource 195-1, server resource 195-2, etc.) in network 190.

In a reverse direction, the network management node 142 receives communications 196 from network 190 targeted for delivery to the wireless stations UE11, UE12, UE13, etc. The network management node 142 communicates the received communications 196 as communications 181 in a downstream direction to the customer premises equipment 131. The customer premises equipment 131 wirelessly communicates the received communications 181 as communications 171 in a downstream direction to the appropriate wireless stations UE11, UE12, UE13, etc.

Accordingly, in a similar manner as previously discussed, the combination of the wireless connectivity 121 and physical communication link 189 provide each of the wireless stations in group 186 to the remote network 190 through the network management node 142.

Via connectivity 122, wireless stations UE21 establishes a respective wireless communication link with the customer premises equipment 132. The wireless station UE21 transmits wireless communications 172 to the customer premises equipment 132. The customer premises equipment 132 converts the received wireless communications 172 into respective one or more communications 182 transmitted from the respective customer premises equipment 132 over physical communication link 189 in an upstream direction to network management node 142. Network management node 142 converts and forwards the received communications 182 into communications 194 communicated to an appropriate one or more target server resources 195 (such as server resource 195-1, server resource 195-2, etc.) in network 190.

In a reverse direction, the network management node 142 receives communications 196 from network 190 targeted for delivery to the wireless stations UE21, UE22, UE23, etc. For example, the network management node 142 communicates the received communications 196 as communications 182 to the customer premises equipment 132. The customer premises equipment 132 wirelessly communicates the received communications 182 as communications 172 to the appropriate wireless stations UE21, UE22, etc.

Accordingly, in a similar manner as previously discussed, the combination of the wireless connectivity 122 and physical communication link 189 (such as a shared communication link) provide each of the wireless stations in group 187 to the remote network 190 through the network management node 142.

In accordance with further embodiments, as previously discussed, the communication management resource 140 in or associated with the network management node 142 allocates (i.e., implements use of) bandwidth in the physical communication link 189 to convey communication data associated with each of the instances of customer premises equipment including first customer premises equipment 131, second customer premises equipment 132, etc.

Embodiments herein include one or more embedded logical control channels for use within the system and equipment described in related application U.S. Ser. No. 16/855,913 filed on Apr. 23, 2020, entitled "PREMISES APPARATUS AND METHODS FOR AGGREGATED HIGH-CAPACITY DATA SERVICES," the entire teachings of which are incorporated herein by this reference. In general, the Node unit (network management node 142) serves as the access point/base station. The CPE units (customer premises equipment 131, 132) serve as the client stations (STAs)/user equipment (UEs). After a connection is established over the HFC network between the Node and one or more CPEs, the connected endpoints (such as network management node 142 and customer premises equipment) then establish a logical control channel between them.

The communication system as discussed herein includes: i) An HFC (Hybrid Fiber Coax) Node unit (such as network management node 142) with integrated controller function (such as communication management resource 140) with functionality for controlling the operation of the CPE units (such as customer premises equipment 131, 132, etc.) within the HFC system served by the Node; ii) one or more HFC CPEs with integrated controller function within the system served by the Node and being managed by the serving node; iii) a dedicated point-to-multipoint logical control channel (LCC) within the point-to-multipoint data connection between the CPEs and a network terminus point for the purposes of managing, monitoring, and provisioning the CPEs. Note that one option for the network terminus is the Controller function on the Node unit. Another option is a centralized management entity behind the Node within the MSO network.

Figure 2:
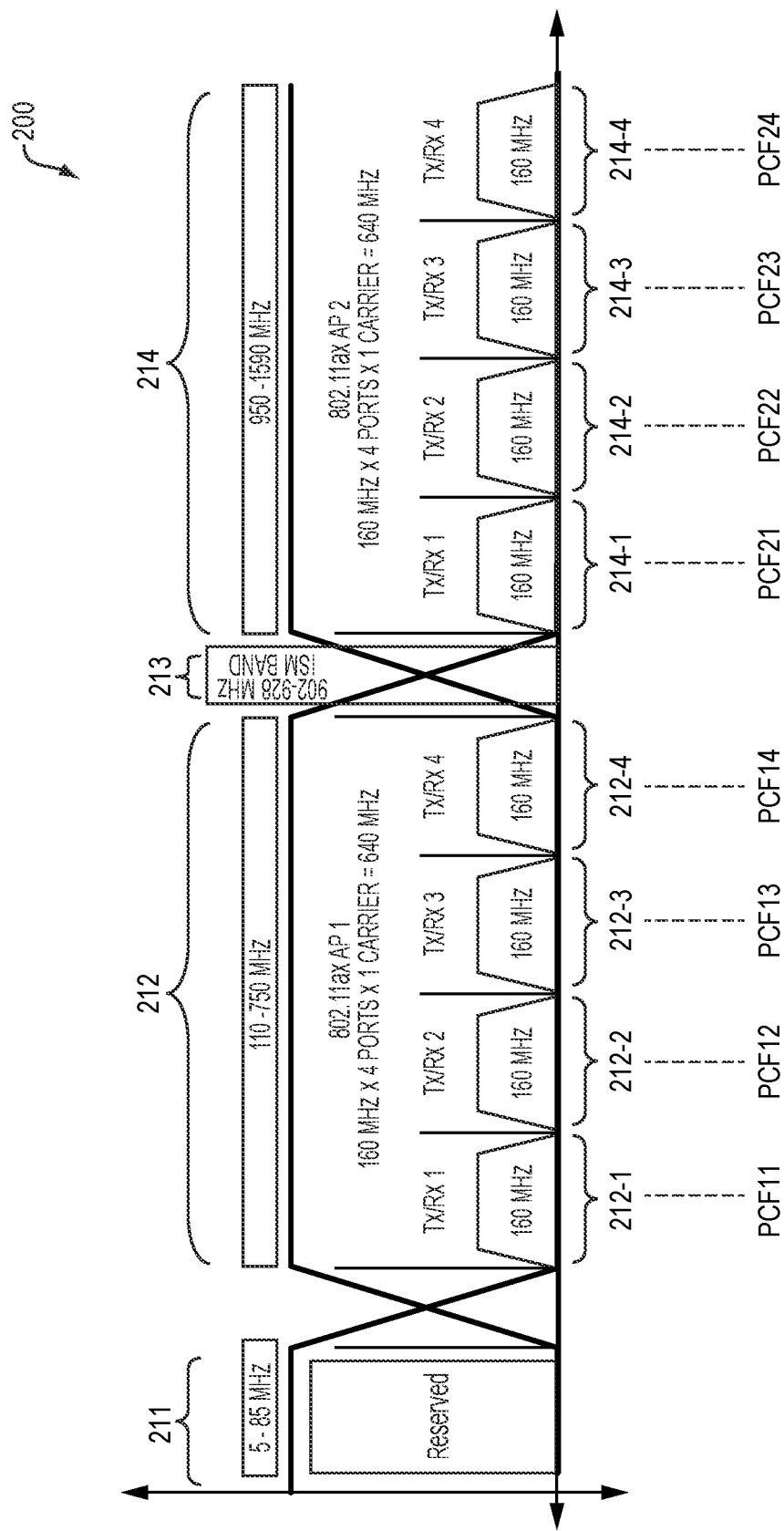
FIG. 2 is an example diagram illustrating bandwidth allocation and assignments according to embodiments herein.

An example of the available bandwidth associated with the physical communication link 189 and corresponding implementation of partitioning is shown in FIG. 2.

FIG. 2 is an example diagram illustrating bandwidth allocation and assignments according to embodiments herein.

Graph 200 of FIG. 2 is a frequency domain representation of the example 802.11ax streams (or other wireless streams such as LTE based) on shared communication link 189 (of an HFC plant of network environment 100) between the network management node 142 and the multiple instances of the customer premises equipment 131, 132, etc.

In this example embodiment, the physical communication link 189 supports conveyance of data in multiple different sub-bands of an available baseband of approximately 1.6 GHz (GigaHertz). The partitioning of the available bandwidth in graph 200 into sub-bands and corresponding use provides high-speed low latency communications between the wireless stations and the network management node 142.

For example, the available baseband spectrum of the physical communication link 189 is partitioned to include a reserved bandwidth 211 between 5-85 MHz (MegaHertz). The available bandwidth in graph 200 further includes bandwidth 212 such as between 110-750 MHz including sub-band 212-1 (such as having center carrier frequency PCF11), sub-band 212-2 (such as having center carrier frequency PCF12), sub-band 212-3 (such as having center carrier frequency PCF13), and sub-band 212-4 (such as having center carrier frequency PCF14).

Spectrum in graph 200 is partitioned to include an ISM (Industrial, Scientific and Medical) bandwidth 213 between 902-928 MHz.

Spectrum in graph 200 further includes bandwidth 213 such as between 950-1590 MHz including sub-band 213-1 (such as having center carrier frequency PCF21), sub-band 213-2 (such as having center carrier frequency PCF22), sub-band 213-3 (such as having center carrier frequency PCF23), and sub-band 213-4 (such as having center carrier frequency PCF24).

Each of the sub-bands in graph 200 supports uplink and downlink communications in accordance with a schedule or acquired use. In one embodiment, each instance of the customer premises equipment and corresponding wireless stations implement a listen before talk protocol prior to wirelessly communicating in the network environment 100.

In further example embodiments, each of the customer premises equipment 131, 132, etc., includes antenna hardware including one or more antenna elements supporting respective wireless communications.

For example, in one embodiment, the customer premises equipment 131 includes a first antenna element A1 to support wireless communications in a first 160 MHz wireless sub-band 212-1; sub-band 212-1 of the physical communication link 189 supports conveyance of corresponding data associated with the first antenna A1 and first wireless sub-band supporting wireless connectivity 121 between customer premises equipment 131 and the respective user equipment. In one embodiment, the first customer premises equipment 131 provides a bidirectional mapping (up conversion/down conversion) between the sub-band 212-1 and the first wireless sub-band supporting wireless connectivity 121. More specifically, in one embodiment, the customer premises equipment 131 receives wireless signals (at a higher wireless carrier frequency) from wireless stations UE11, UE12, etc., over wireless connectivity 121 and down converts them to the sub-band 212-1 (lower frequency) communicated over the physical communication link 189. Conversely, the customer premises equipment 131 receives signals (at a lower frequency) in the sub-band 212-1 from the physical communication link 189 (as transmitted from the network management node 142) and up converts them to the corresponding wireless signals at a higher carrier frequency for communication from the customer premises equipment 131 to the wireless stations UE11, UE12, etc., via wireless connectivity 121.

As previously discussed, the wireless carrier frequencies associated with the connectivity 121 can be those support by any suitable wireless communication protocol such as associated with Wi-Fi™, LTE (Long Term Evolution), CBRS (Citizens Band Radio System), cellular, etc.

The customer premises equipment 131 includes a second antenna element A2 to support wireless communications in a second 160 MHz wireless sub-band 212-2; sub-band 212-2 of the physical communication link 189 supports conveyance of corresponding data associated with the antenna A2 and the second wireless sub-band supporting wireless connectivity 121. In one embodiment, the first customer premises equipment 131 provides a bidirectional mapping (up conversion/down conversion) between the sub-band 212-2 and the second wireless sub-band supporting wireless connectivity 121. More specifically, in one embodiment, the customer premises equipment 131 receives wireless signals (at a higher wireless carrier frequency) from wireless stations UE11, UE12, etc., over wireless connectivity 121 and down converts them to the sub-band 212-2 (lower frequency) communicated over the physical communication link 189. Conversely, the customer premises equipment 131 receives signals (at a lower frequency) in the sub-band 212-2 from the physical communication link 189 (as transmitted from the network management node 142) and up converts them to the corresponding wireless signals at a higher carrier frequency for communication from the customer premises equipment 131 to the wireless stations UE11, UE12, etc., via wireless connectivity 121.

The customer premises equipment 131 includes a third antenna element A3 to support wireless communications in a third 160 MHz wireless sub-band 212-3; sub-band 212-3 of the physical communication link 189 supports conveyance of corresponding data associated with the antenna A3 and the third wireless sub-band supporting wireless connectivity 121. In one embodiment, the first customer premises equipment 131 provides a bidirectional mapping (up conversion/down conversion) between the sub-band 212-3 and the second wireless sub-band supporting wireless connectivity 121. More specifically, in one embodiment, the customer premises equipment 131 receives wireless signals (at a higher wireless carrier frequency) from wireless stations UE11, UE12, etc., over wireless connectivity 121 and down converts them to the sub-band 212-3 (lower frequency) communicated over the physical communication link 189. Conversely, the customer premises equipment 131 receives signals (at a lower frequency) in the sub-band 212-3 from the physical communication link 189 (as transmitted from the network management node 142) and up converts them to the corresponding wireless signals at a higher carrier frequency for communication from the customer premises equipment 131 to the wireless stations UE11, UE12, etc., via wireless connectivity 121.

The customer premises equipment 131 includes a fourth antenna element A4 to support wireless communications in a second 160 MHz wireless sub-band 212-4; sub-band 212-4 of the physical communication link 189 supports conveyance of corresponding data associated with the antenna A4 and the fourth wireless sub-band supporting wireless connectivity 121. In one embodiment, the first customer premises equipment 131 provides a bidirectional mapping (up conversion/down conversion) between the sub-band 212-4 and the fourth wireless sub-band supporting wireless connectivity 121. More specifically, in one embodiment, the customer premises equipment 131 receives wireless signals (at a higher wireless carrier frequency) from wireless stations UE11, UE12, etc., over wireless connectivity 121 and down converts them to the sub-band 212-4 (lower frequency) communicated over the physical communication link 189. Conversely, the customer premises equipment 131 receives signals (at a lower frequency) in the sub-band 212-4 from the physical communication link 189 (as transmitted from the network management node 142) and up converts them to the corresponding wireless signals at a higher carrier frequency for communication from the customer premises equipment 131 to the wireless stations UE11, UE12, etc., via wireless connectivity 121.

In one embodiment, one or more of the multiple instances of customer premises equipment in network environment 100 support communications at wireless carrier frequencies such as 2.4 Ghz, 5 GHz, etc.

Note further that the multiple instances of customer premises equipment support wireless communications such as based on Wi-Fi™ (IEEE Std. 802.11ax), cellular (e.g., 3GPP 4G or 5G, etc.) wireless services, and for ISM-band (e.g., 900 MHz) communications.

In a similar manner as previously discussed, via appropriate mapping (and up conversion and down conversion provided by the customer premises equipment), the sub-bands 214-1, 214-2, 214-3, and 214-4 can be configured to support data associated with wireless communications.

Thus, via partitioning of the wireless spectrum in graph 200 and subsequent implementation, embodiments herein include (at the network management node 142) allocating a first sub-band 212-1 in the physical communication link 189 for data associated with a first 160 MHz wireless sub-band; allocating a second sub-band 212-2 in the physical communication link 189 for data associated with a second 160 MHz wireless sub-band; allocating a third sub-band 212-3 in the physical communication link 189 for data associated with a third 160 MHz wireless sub-band; allocating a fourth sub-band 212-4 in the physical communication link 189 for data associated with a fourth 160 MHz wireless sub-band.

Referring again to FIG. 1, depending on the embodiment, each of the control channels LCC31, LCC32, etc., can be established in any suitable one or more bands of the wireless spectrum in graph 200 as previously discussed.

For example, in one embodiment, the communication management resource 140 establishes the control channel LCC31 (logical control channel) in one or more of first sub-band 212-1, second sub-band 212-2, third sub-band 212-3, and fourth sub-band 212-4, supporting conveyance of data associated with wireless bandwidth implemented by the one or more instances of the customer premises equipment.

More specifically, in further example embodiments, each of the control channels (such as logical control channels LCC31, LCC32, etc.) is embedded as a logical channel within a specific selected one or more of the raw 802.11ax data streams (such as in one or more sub-bands 212-1, 212-2, 212-3, 212-4, 214-1, 214-2, 214-3, 214-4, etc.) where the respective communication control entities at each of the end nodes communicates over a private network either via a private network address (e.g. 169.254.47.0/24) or VLAN assigned by the network management node 142.

In one embodiment, the network management node 212 assigns the unique network address, VLAN, etc., and corresponding one or more sub-bands that carries the control channel during initial setup of the control channel. The assignment of the network address, VLAN, etc., in the corresponding sub-band to the respective customer premises equipment 131 enables segregation of control channel traffic directed to the specific customer premises equipment 131 from other traffic communicated over the wireless spectrum of the shared communication link 189 through the customer premises equipment to the wireless stations.

Note that as an alternative to establishing the respective control channel in one or more sub-bands, the communication management resource 140 or other suitable entity associated with the network management node 142 can be configured to establish the control channel LCC31 with the customer premises equipment 131 in a sub-band 211 such as in the band 5-85 MHz or in the sub-band 213 (such as 902-928 MHz) disposed between the sub-bands 212 and the sub-bands 214. In one embodiment, these sub-bands 211 and 213 do not convey corresponding wireless bandwidth supported by the customer premises equipment and are reserved for alternative communications.

In accordance with further example embodiments, in one implementation, the allocated bandwidth in the physical communication link is partitioned in accordance with wireless bandwidth supported by the first customer premises equipment.

The communication management resource 140 of network management node 142 establishes a control channel over the physical communication link 189 between the network management node 142 and at least the first customer premises equipment 131 and potentially other instances of customer premises equipment. The implementation of one or more control channels as discussed herein provides a unique way of controlling operation of one or more instances of customer premises equipment in a network environment, resulting in more efficient use of wired and wireless services.

Via a respective established control channel, the communication management resource 140 then transmits one or more messages such as including a command over the control channel from the network management node to the first customer premises equipment. The command controls operation of the first customer premises equipment. In one embodiment, the one or more commands communicated from the communication management resource 140 over the control channel LCC31 controls one or more attributes of the respective recipient customer premises equipment such as: i) channel configuration associated with the recipient customer premises equipment 131, ii) a wireless transmit power level of the customer premises equipment 131 communicating with respective wireless stations UE11, UE12, etc., iii) enable or disable operation of the customer premises equipment 131, etc.

In further example embodiments, in response to communicating a control command over the control channel LCC31 to the first customer premises equipment 131, the communication management resource 140 at the network management node 142 receives corresponding one or more reply communications from the first customer premises equipment 131 over the control channel LCC31.

As previously discussed, the communication management resource 140 communicates one or more messages such as control commands over the control channel LCC31 to control operation of the first customer premises equipment 131. In one embodiment, the one or more control commands notify the first customer premises equipment 131 of a wireless power level at which to transmit wireless communications from the first customer premises equipment 131 to one or more wireless stations UE11, UE12, UE13, etc., (communication devices) in a respective subscriber domain 151 in which the first customer premises equipment 131 resides. Thus, as its name suggests, the control channel LCC31 can be used for control purposes.

In a reverse direction, the communication management resource 140 associated with the network management node 142 can be configured to receive and monitor the first customer premises equipment 131. Thus, messaging over the control channel LCC31 can be used for monitoring purposes as well.

Figure 3:
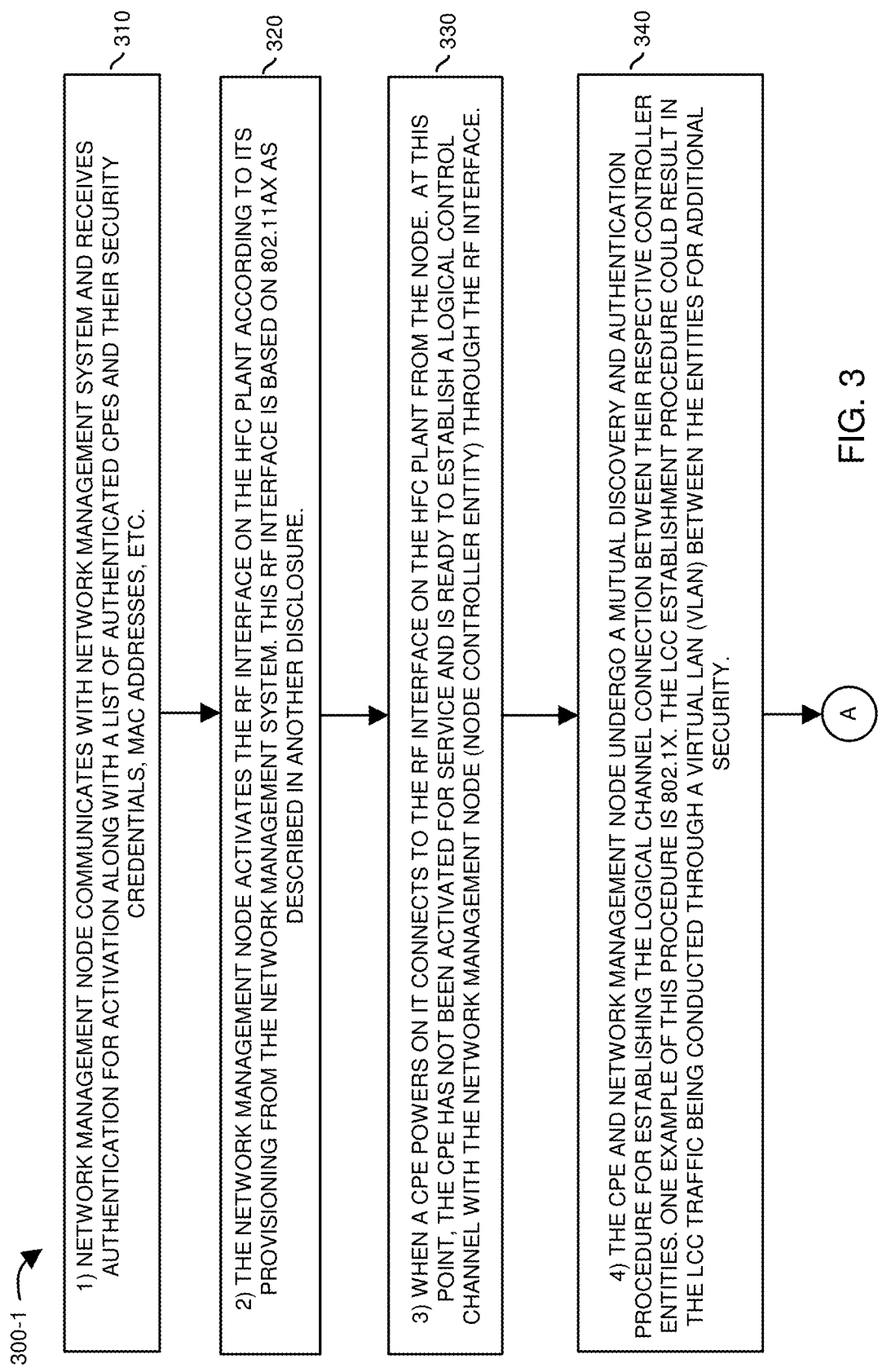
FIGS. 3 and 4 represent a method of establishing a control channel over a shared communication link according to embodiments herein.
Figure 4:
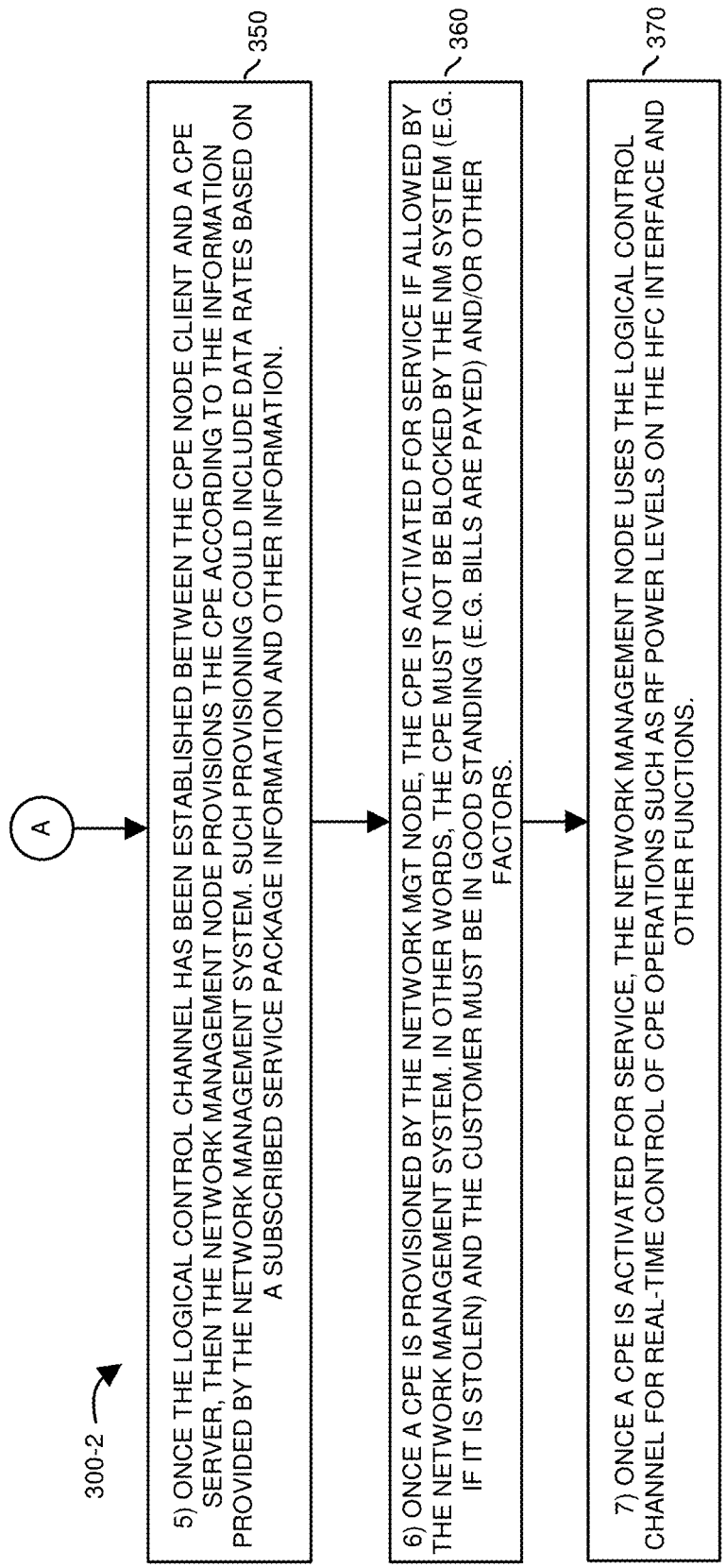

FIGS. 3 and 4 represent a method (flowchart) of establishing a control channel over a shared communication link according to embodiments herein. The following discussion refers to a combination of FIGS. 1-4.

Via operation 310, prior to establishing a respective control channel such as control channel LCC31 associated with the customer premises equipment 131, the network management node 142 communicates with network management system 141 to determine which of the instances of customer premises equipment in network environment 100 to provide access to the remote network 190.

In one embodiment, via communications received from the network management system 141, the network management node 142 receives authentication for its operation along with a list of customer premises equipment that have been authenticated/authorized for use (such as providing wireless services, connectivity etc.) via use of physical communication link 189. In further example embodiments, the network management node 142 receives security credentials, network addresses (such as MAC addresses), etc., associated with each of the multiple instances of customer premises equipment that have been authenticated for use.

In operation 320, the network management node 142 activates the RF (Radio Frequency) interface 101 according to provisioning information received from the network management system 141. In one embodiment, the RF interface 101 is based on a wireless communication protocol such as 802.11ax as described in related application U.S. Ser. No. 16/855,913 filed on Apr. 23, 2020, entitled "PREMISES APPARATUS AND METHODS FOR AGGREGATED HIGH-CAPACITY DATA SERVICES," the entire teachings of which are incorporated herein by this reference.

In operation 330, when the customer premises equipment 131 powers on, the customer premises equipment 131 establishes an initial communication connection with the RF interface 101 of the network management node such as in a HFC (Hybrid Fiber-Coaxial) plant. The customer premises equipment 131 is programmed to contact the network management node 142 if access is desired by the customer premises equipment 131.

At this point, assume that the customer premises equipment 131 has not been activated for service and is ready to establish a logical control channel LCC13 with the network management node 142 (a.k.a., node controller entity). In one embodiment, the customer premises equipment 131 and network management node 142 use an open network address dedicated to support communications between the network management node 142 and any of the instances of customer premises equipment. For example, the customer premises equipment 131 communicates a message (such as via communications 181) over the physical communication link 189 to the RF interface 101 of the network management node 142. The request message includes a network address XX31 (such as MAC address) assigned to the customer premises equipment 131. Accordingly, the network management node 142 has knowledge of a unique identifier value (XX31) assigned to the customer premises equipment 131 requesting access.

In operation 340, the customer premises equipment 131 and network management node 142 implement a mutual discovery and authentication procedure for establishing the logical channel connection LCC31. In one embodiment, this procedure is implemented in accordance with 802.1x or other suitable protocol. In general, IEEE 802.1x is an IEEE Standard for port-based Network Access Control (PNAC). It is part of the IEEE 802.11 group of networking protocols and provides an authentication mechanism to devices wishing to attach to a LAN or WLAN.

In further example embodiments, via communications between the network management node 142 and the customer premises equipment 131 during initial setup of the control channel LCC31, as previously discussed, the customer premises equipment 131 receives notification of a particular network address (such as XX31) of the customer premises equipment 131. The network management node 142 uses the network address XX31 for initial communications as above.

In one embodiment, subsequent to or during a process of authenticating the customer premises equipment 131 for service, the network management node 142 notifies the customer premises equipment of a network address assigned to the control channel LCC31. Assume in this example embodiment, that the network address YY31 (terminus) is assigned by the network management node 142 to the customer premises equipment 131 for receiving communications associated with the control channel LCC31. In such an instance, the network management node 142 communicates messages over the control channel LCC31 via inclusion of network address YY31 in such communications. The customer premises equipment 131 monitors for presence of a destination value of YY31 in the communications received over the physical communication link 189 to identify communications from the network management node 142 communicated over the physical communication link 189.

In one embodiment, note further that the setup of the logical control channel LCC31 may include notifying the customer premises equipment 131 of which of one or more sub-bands to monitor for communications transmitted by the network management node 142 to the customer premises equipment 131. In further example embodiments, the network management node 142 assigns the sub-band 212-1 to convey communications associated with user equipment UE11, UE12, UE13, etc., between the network management node 142 and the customer premises equipment 131. In such an instance, the control channel LCC31 is established in the sub-band 212-1 because it is also assigned to convey communications associated with the corresponding user equipment supported by the customer premises equipment 131. Thus, to receive future communications transmitted by the network management node 142 over the control channel LCC31, the customer premises equipment 131 monitors the sub-band 212-1 for any communications having a destination address of YY31 as such communications are associated with the established control channel LCC31.

If desired, this procedure of establishing the control channel LCC31 results in the control channel traffic (such as commands) being communicated through a virtual LAN (Local Area Network) or VLAN (Virtual LAN) between the network management node 142 and the customer premises equipment 131 for additional security.

In operation 350, after the logical control channel LCC31 has been established between the network management node 142 and the customer premises equipment 131 (such as customer premises equipment server), the network management node 142 provisions the customer premises equipment 131 according to the information provided by the network management system 141. In one embodiment, such provisioning includes communication of data rate control information from the network management node 142 to the customer premises equipment 131 over the control channel LCC13. In further example embodiments, the data rate control information indicates uplink/downlink data rates to provide to the customer premises equipment in accordance with a subscriber service package purchased by the subscriber associated with the subscriber domain 151.

In operation 360, after the customer premises equipment 131 is provisioned by the network management node 142, the customer premises equipment 131 is activated for providing wireless service if allowed by the network management system 141. In other words, in one embodiment, the customer premises equipment 131 must not be blocked by the network management system 141 in order to be enabled. If the network management system 141 detects attributes such as that the customer premises equipment 131 is not a stolen item and the customer associated with subscriber domain 151 has paid invoices for respective use of the customer premises equipment 131, the network management system 141 provides authorization to the network management node 142 to activate the customer premises equipment 131 for use of the physical communication link 189.

In operation 370, after the customer premises equipment 131 is activated for providing wireless service to respective wireless stations UE11, UE12, etc., via communications and configuration by the network management node 142, the network management node 142 uses the logical control channel LCC31 for real-time control of operations associated with the customer premises equipment 131 such as control of RF power levels of communications over the physical communication link 189 and other functions.

Figure 5:
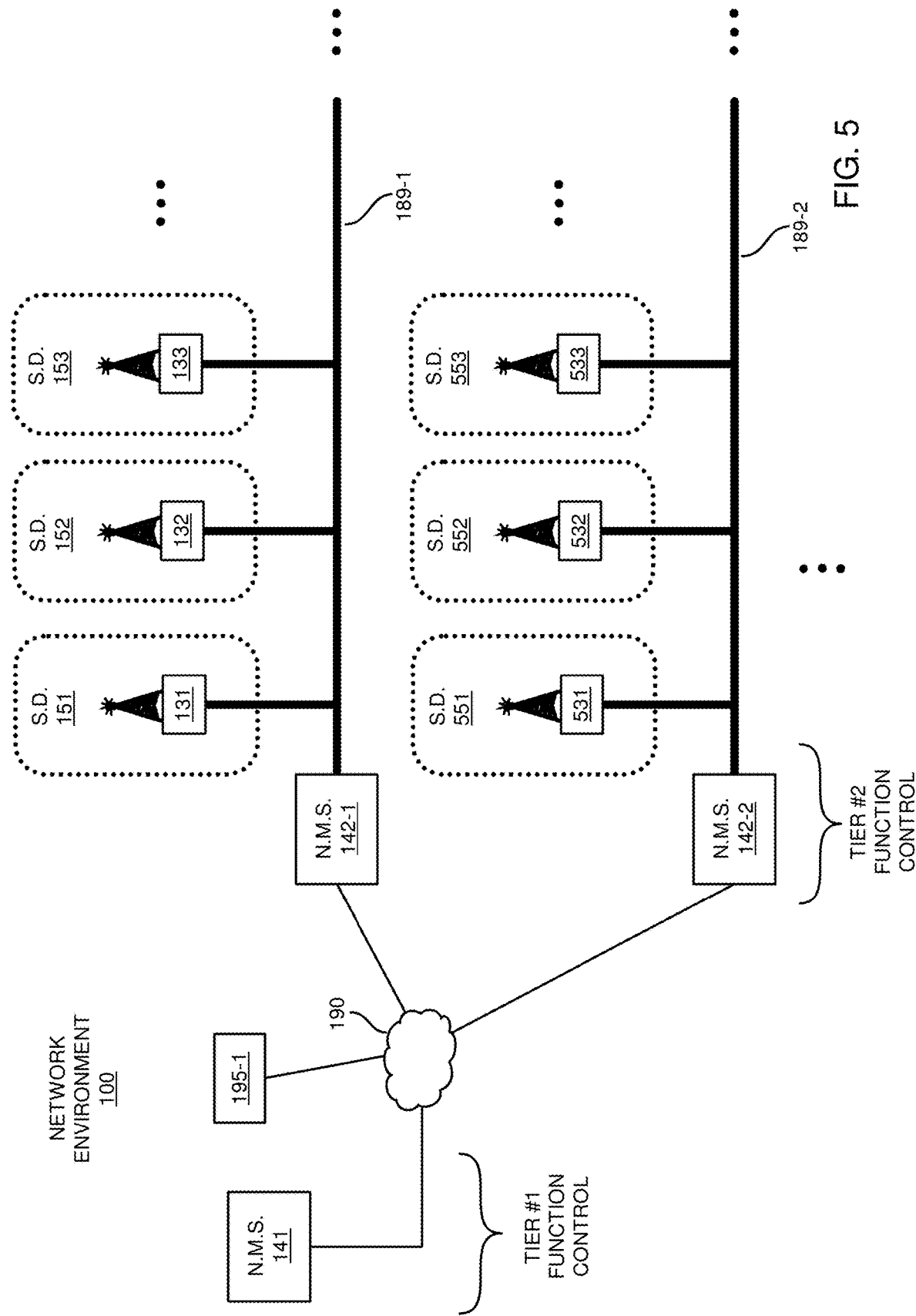
FIG. 5 is an example diagram illustrating control channel implementation at multiple tiers in a network environment according to embodiments herein.

FIG. 5 is an example diagram illustrating control channel implementation at multiple tiers in a network environment according to embodiments herein.

In accordance with further example embodiments, the communication management resource 140 associated with the network management node 142 establishes respective one or more control channels over the physical communication link 189 between the network management node 142 and each of the multiple instances of customer premises equipment including the first customer premises equipment and second customer premises equipment. In one embodiment, each of the control channels LCC31, LC32, etc., supports unicast communications such as point to point (individual) control channel connectivity.

In accordance with further example embodiments, the physical communication link 189 supports multicast communication links. For example, the network management node 142-1 can be configured to establish a multicast link in the shared communication link 189 and simultaneously communicate messages to multiple instances of customer premises equipment of the multicast link. Each instance of the customer premises equipment potentially joins the multicast link to receive messages from the network management node 142-1.

Alternatively, the network management node 142-1 or other suitable entity broadcasts messages over a respective control channel to multiple listening instances of customer premises equipment. For example, in one embodiment, the network management node 142-1 or network management system 140 communicates messages over a broadcast control channel of the physical communication links 189 (such as shared communication link 189-1, shared communication link 189-2, etc.). The multiple instances of customer premises equipment monitor the broadcast control channel and receive corresponding messages from the network management node 142-1, network management system 140, etc.

Note that further embodiments herein include implementing a tiered approach to providing messages over a respective shared communication link 189 to each of the instances of customer premises equipment. For example, in one embodiment, the one or more control channels (unicast, multicast, broadcast, etc.) support tier #1 control functions originated from the network management system 141 to one or more of the instances of customer premises equipment.

The one or more control channels (unicast, multicast, broadcast, etc.) support tier #2 control functions originated from a respective network management node 142 to one or more of the instances of customer premises equipment; and so on. For example, in one embodiment, the network management node 142-1 (at tier #2) broadcasts control channel communications over physical communication link 189-1 to one or more instances of customer premises equipment 131, 132, etc.; the network management node 142-2 (at tier #2) broadcasts control channel communications over physical communication link 189-2 to one or more instances of customer premises equipment 531, customer premises equipment 532, etc.; and so on.

Figure 6:
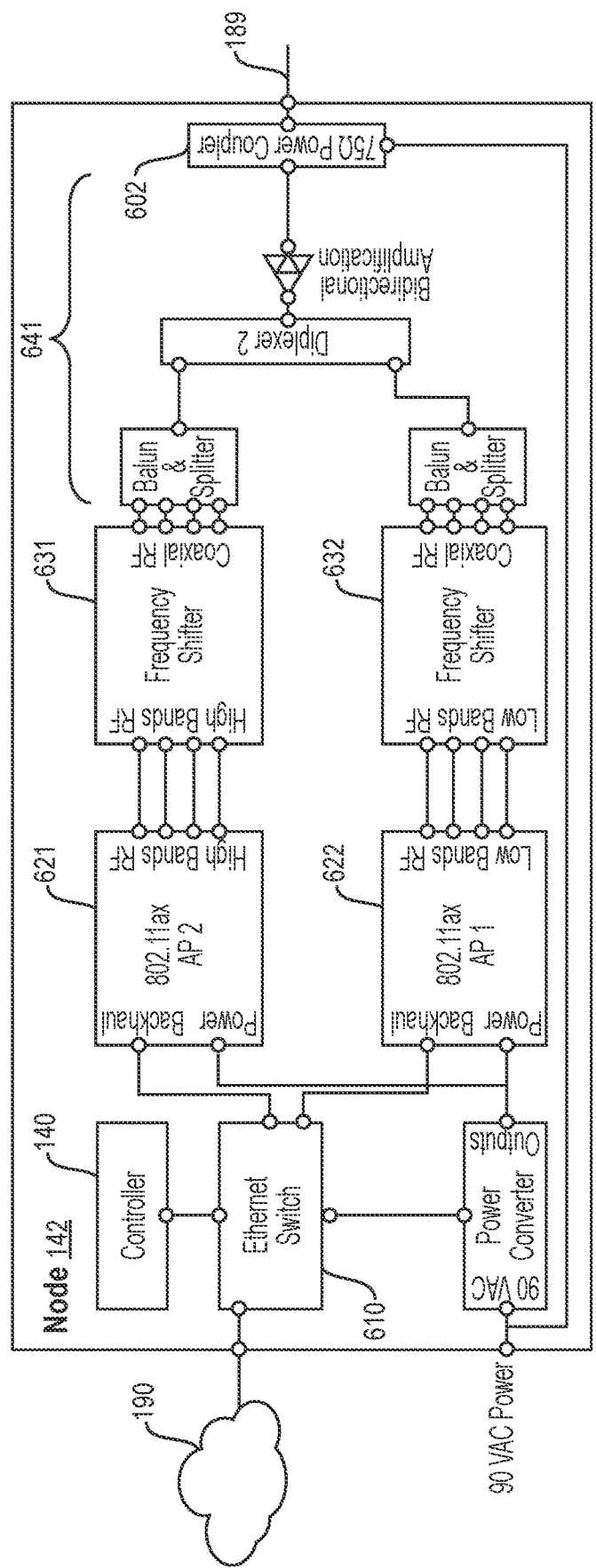
FIG. 6 is an example diagram illustrating a network management node according to embodiments herein.

FIG. 6 is an example diagram illustrating a network management node according to embodiments herein.

In this example embodiment, the network management node 142 includes communication management resource 140, switch 610, processor 621, processor 622, frequency shifter 631, frequency shifter 632, amplifier/splitter function 641, and coupler 602 (such as 75 ohm). In general, the control function (communication management resource 140) is connected through switch 610 to the Backhaul ports of the 802.11ax AP functions 621 and 622. This allows the communication management resource 140 of the network management node 142 to serve as one possible terminus for the LCC channel(s).

Figure 7:
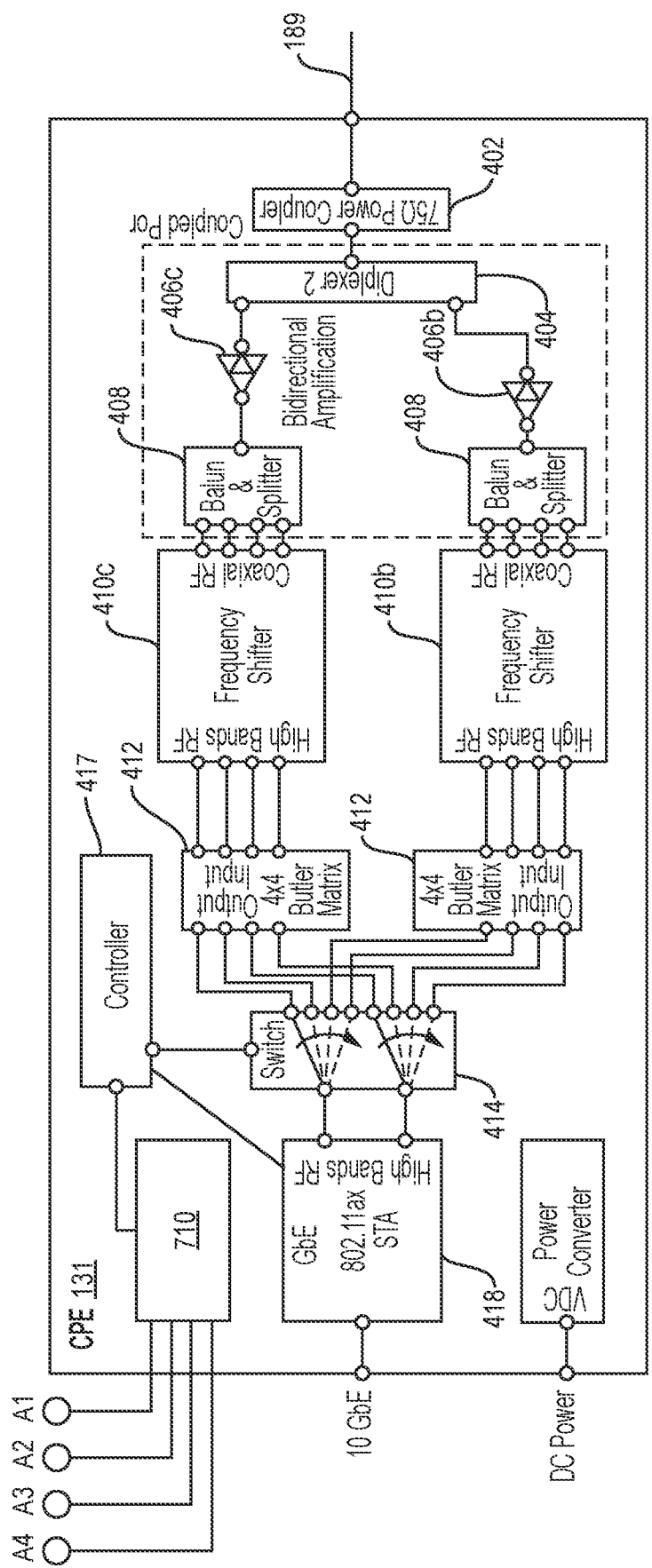
FIG. 7 is an example diagram illustrating of customer premises equipment according to embodiments herein.

FIG. 7 is an example diagram illustrating of customer premises equipment according to embodiments herein.

In general, the germane aspects are the Controller 417 function (a.k.a., communication management resource 140) of customer premises equipment 131 which is connected through an Ethernet port to the 802.11ax STA chipset. This allows the CPE Controller function to serve as the far-end terminus for each LCC channel.

As shown in FIG. 7, customer premises equipment 131 includes a 75 ohm signal coupler 402, a plurality of diplexers 404, a plurality of bidirectional amplifiers 406B and 406C, a plurality of frequency shifters 410B and 410C, two (2) 4×4 Butler matrices 412, switch 414, wireless module 710 (such as supporting Wi-Fi™ or other suitable wireless communication protocol) a controller module 417, an 802.11ax STA (station) 418, and antenna hardware such as A1, A2, A3, and A4.

In one embodiment, the coupler 402 is configured to couple the ISM data from the other data encoded in the RF signal (e.g., control data transmitted from an upstream controller process within the designated ISM band on the physical communication link 189) received by the CPE 131 via physical communication link 189 (such as a coaxial cable. The information received via ISM band as processed by the ISM transceiver 416 comprises information related to controlling the switch(es) 414 so that the information from appropriate combinations of ports from the Butler matrices 412 can be communicated to the 802.11ax STA module 418 for transmission of the data to one or more user devices (e.g., via the GbE port of the CPE). The controller 417 receives the foregoing information from the ISM transceiver 416 and operates or configures the switch 414 accordingly. The controller 417 receives real-time data that causes the switches 414 to operate in a manner such the CPE 131 makes use of the appropriate ports of the Butler matrices (i.e., the first switch is coupled to one of the diversity ports of the 802.11ax chipset, and switched between inputs from the second and third frequency shifters 410B, 410C such that each STA/CPE can access either the upper or lower bands as output from the respective frequency shifters).

As previously discussed, the customer premises equipment 131 can be configured to include antenna hardware such as antenna A1, A2, A3, and A4. The customer premises equipment 131 receives wireless communications from wireless stations UE11, UE12, UE13, etc., over the antenna hardware, down converts the received wireless bands, and communicates the down converted bands over sub-bands of the physical communication link 189.

For example, assume that the customer premises equipment 131 has been assigned a first sub-band 212-1 and wireless carrier frequency WCF11 to convey communications associated with the user equipment UE11, UE12, etc. In such an instance, the customer premises equipment 131 receives wireless signals from user equipment conveyed over carrier frequency WCF11. The customer premises equipment 131 frequency shifts (via down converting) the wireless carrier frequency WCF11 to the carrier frequency PCF11, resulting in transmission of the signals (modulated in carrier frequency PCF11 of sub-band 212-1) from customer premises equipment 131 over the physical communication link 189 to the network management node 142.

In a reverse direction, the customer premises equipment 131 receives communications from the network management node 142 over the physical communication link 189 in sub-band 212-1 and carrier frequency PCF11. In such an instance, for those communications targeted to corresponding user equipment UE11, UE12, etc., the customer premises equipment 131 up converts the received bands of signals in sub-band 212-1 and communicates the up converted bands of signals (signals are modulated onto the wireless carrier frequency WCF11) as wireless communications from the antenna hardware of the customer premises equipment 131 to the target wireless stations UE11, UE12, etc. Thus, in this example embodiment, the wireless carrier frequency WCF11 maps to carrier frequency PCF11 and vice versa with respect to conveying communications through the customer premises equipment 131.

As previously discussed, one terminus of the respective control channel LCC31 may be the customer premises equipment 131. The customer premises equipment 131 analyzes received messages over the control channel LCC31 in sub-band 212-1 to determine which messages are conveyed over the control channel LCC31 and targeted to the customer premises equipment 131.

Figure 8:
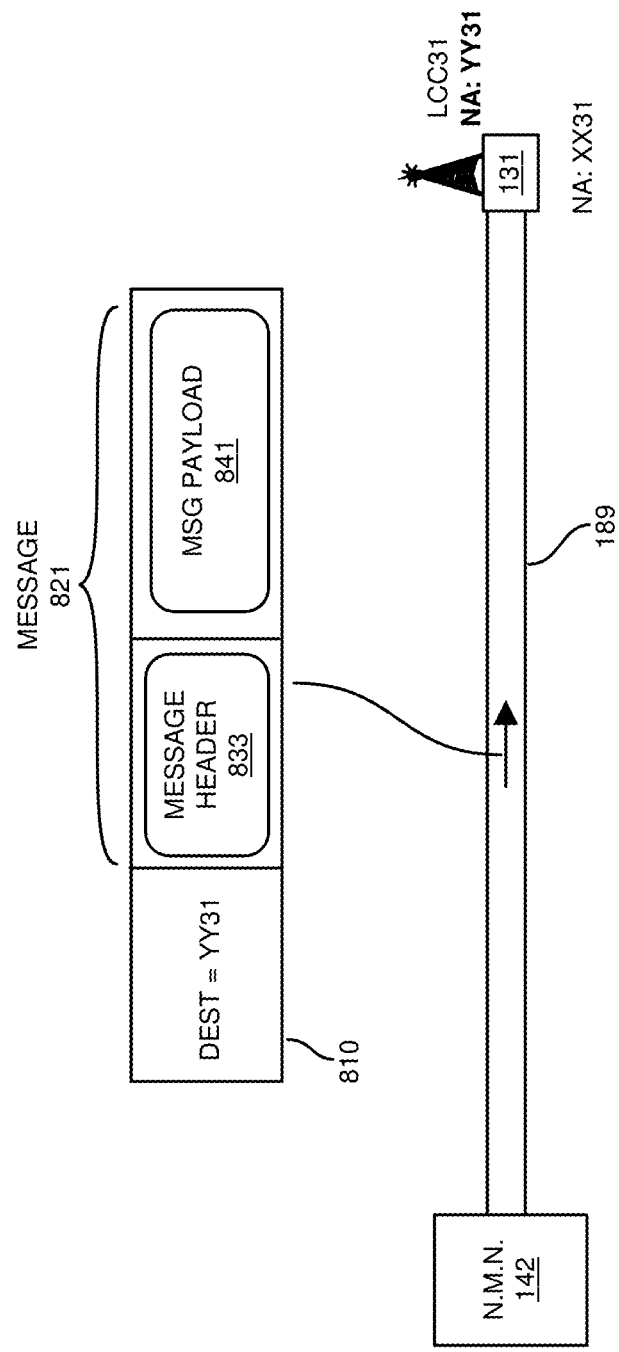
FIG. 8 is an example diagram illustrating a control channel message according to embodiments herein.

FIG. 8 is an example diagram illustrating a control channel message according to embodiments herein.

As previously discussed, the network management node 142 communicates messages over the control channel LCC31 to the customer premises equipment 131, the network management node 142 communicates messages over the control channel LCC32 to the customer premises equipment 132, and so on.

For example, also as previously discussed, during initial setup of the respective control channel, the network management node 142 assigns or provisions the customer premises equipment 131 to use a specific network address YY31 (i.e., unique identifier value) in a dedicated address space to receive communications from the network management node 142, network management system 141, etc. The customer premises equipment 131 monitors the assigned one or more sub-bands to receive the communications from the network management node 142 over the control channel LCC31.

As previously discussed, the network management node 142 or other suitable entity communicates a control channel message as a data packet 810 over a respective sub-band. For example, the data packet 810 communicated from the network management node 142 over the control channel LCC31 includes a destination network address of YY31 indicating that the data packet 810 is transmitted over the control channel LCC31 and targeted for delivery to the customer premises equipment 131. In such an instance, the message 821 of the data packet 810 includes message header 833 (such as a tag value indicating the control message) as well as the control message payload 841. In one embodiment, execution of a command as indicated by the message payload 841 of the message 821 controls operation of the customer premises equipment 131.

Figure 9:
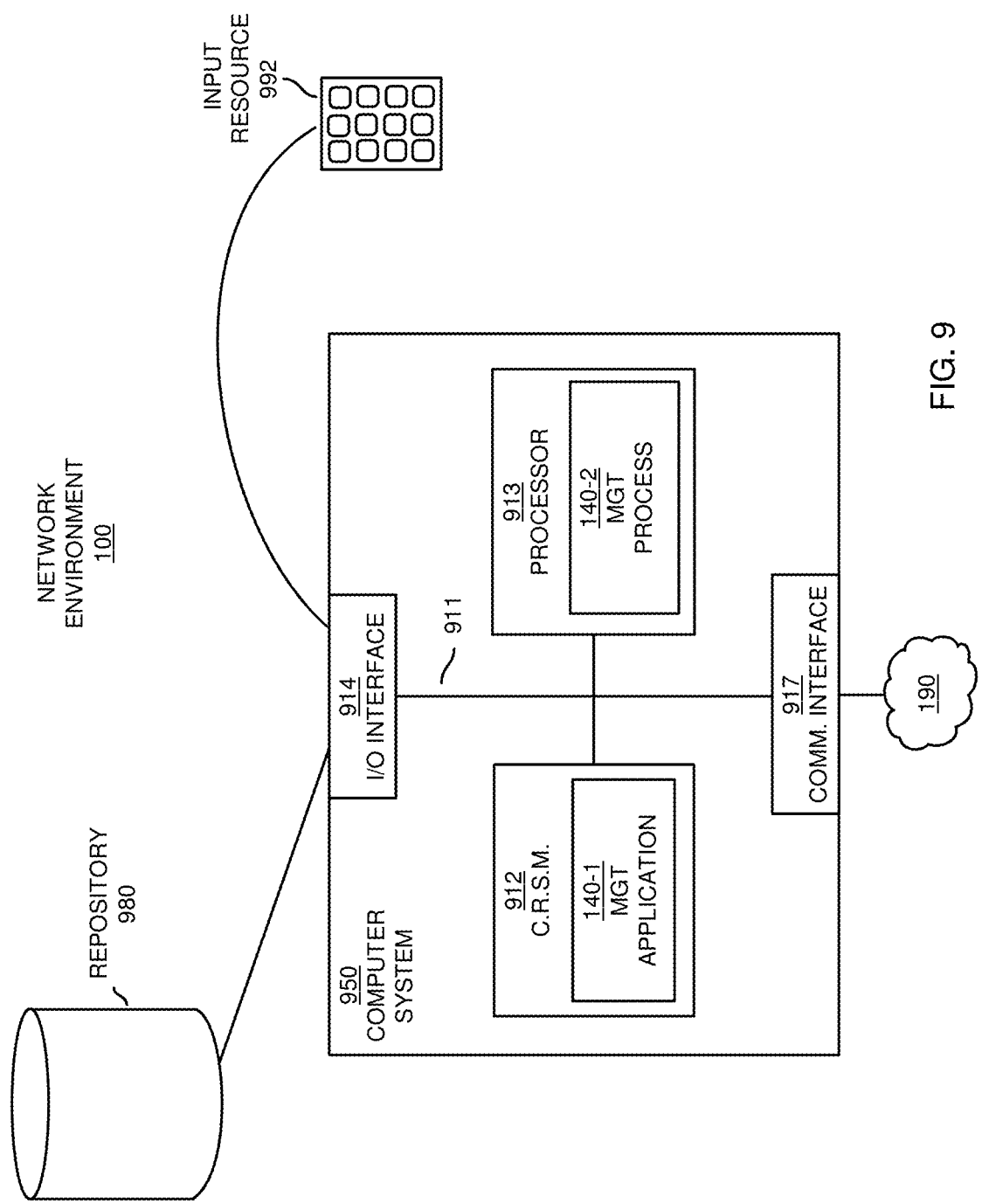
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as wireless stations, communication management resource 140, network management system 141, network management node 142, etc.) as discussed herein can be configured to include computer processor hardware and/or corresponding executable instructions to carry out the different operations as discussed herein via computer system 950.

As shown, computer system 950 of the present example includes an interconnect 911 coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein. In other words, management application 140-1 can be configured to execute operations associated with network management system 141, network management node 142, customer premises equipment 131, etc.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein. In one embodiment, the control system 950 can include or be implemented in virtualization environments such as the cloud.

Functionality supported by the different resources will now be discussed via flowcharts in FIG. 9. Note that the steps in the flowcharts below can be executed in any suitable order.

Figure 10:
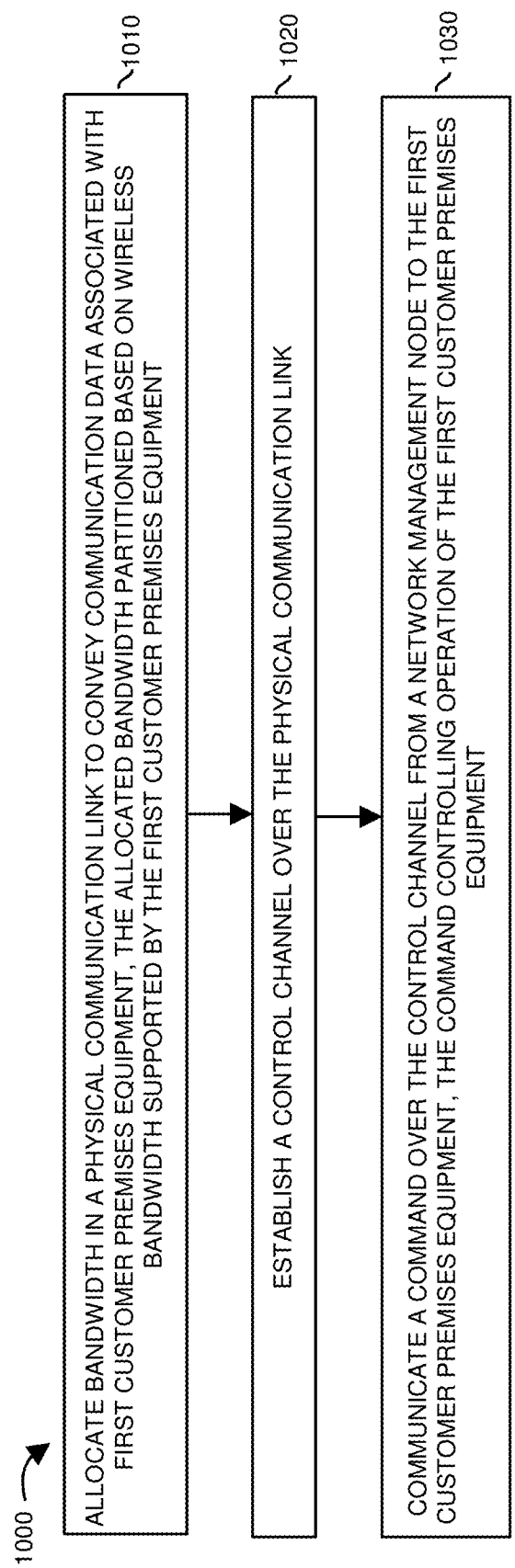
FIG. 10 is an example diagram illustrating a method according to embodiments herein.

FIG. 10 is a flowchart 1000 illustrating an example method according to embodiments. Note that flowchart 1000 overlaps/captures general concepts as discussed herein.

In processing operation 1010, the communication management resource 140 associated with the network management node 142 allocates (implements) bandwidth in a physical communication link 189 (such as shared communication link) to convey communication data associated with first customer premises equipment. In one embodiment, the allocated bandwidth in the physical communication link 189 is partitioned based on wireless bandwidth supported by the first customer premises equipment 131.

In processing operation 1020, the communication management resource 140 associated with network management node 141 establishes a control channel LCC31 over the physical communication link 189.

In processing operation 1030, the communication management resource 140 associated with network management node 141 communicates one or more messages over the control channel LCC31 from network management node 142 to the first customer premises equipment 131. In one embodiment, as previously discussed, the one or more messages include a command controlling operation of the first customer premises equipment 131. For example, as previously discussed, the one or more commands issued by the communication management resource 140 or other suitable entity such as network management system 140 controls one or more attributes of the respective recipient customer premises equipment 131 such as: i) channel configuration associated with the recipient customer premises equipment 131, ii) a wireless transmit power level of the customer premises equipment 131 communicating with respective wireless stations UE11, UE12, etc., iii) enable or disable operation of the customer premises equipment 131, etc.

Note again that techniques herein are well suited to facilitate more efficient operation of providing network access. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   allocating bandwidth in a physical communication link to convey communication data between a network management node and first customer premises equipment, the allocated bandwidth of the physical communication link partitioned based on partitions of wireless bandwidth supported by the first customer premises equipment;
   establishing a control channel over the physical communication link between the network management node and the first customer premises equipment; and
   communicating a command over the control channel from the network management node to the first customer premises equipment, the command controlling operation of the first customer premises equipment;

wherein a first portion of the allocated bandwidth in the physical communication link supports transmission of first data from the network management node to the first customer premises equipment, the first customer premises equipment operative to wirelessly communicate the first data over a first portion of the wireless bandwidth from the first customer premises equipment; and wherein the first portion of the allocated bandwidth in the physical communication link supports transmission of second data from the first customer premises equipment to the network management node, the first customer premises equipment operative to wirelessly receive the second data over the first portion of the wireless bandwidth.

2. The method as in claim 1, wherein the control channel is bidirectional, the method further comprising:
in response to communicating the command, receiving a corresponding reply communication from the first customer premises equipment communicating over the control channel.

3. The method as in claim 1, wherein the command notifies the first customer premises equipment of a wireless power level at which to wirelessly transmit communications from the first customer premises equipment.

4. The method as in claim 1 further comprising:
establishing the control channel over the physical communication link between the network management node and multiple instances of customer premises equipment including the first customer premises equipment and second customer premises equipment.

5. The method as in claim 1, wherein a first sub-band of the allocated bandwidth in the physical communication link is allocated to convey data corresponding to a first antenna of the first customer premises equipment.

6. The method as in claim 1, wherein allocating the bandwidth includes:
allocating a first sub-band in the physical communication link, the first sub-band being allocated to convey data received over a first antenna of the first customer premises equipment; and
allocating second sub-band in the physical communication link, the second sub-band being allocated to convey data received over a second antenna of the first customer premises equipment.

7. The method as in claim 1, wherein establishing the control channel includes:
communicating access information from the network management node to the first customer premises equipment, the access information providing the first customer premises equipment access to subsequent communications directed from the network management node to the first customer premises equipment.

8. The method as in claim 1 further comprising:
implementing the control channel via communication of the command in a header associated with a data payload communicated from the network management node to the first customer premises equipment.

9. The method as in claim 1, wherein the control channel is established in a second portion of the allocated bandwidth.

10. The method as in claim 1, wherein the control channel is established in the first portion of the allocated bandwidth in the physical communication link.

11. The method as in claim 1, wherein establishing the control channel includes: i) assigning a network address to the control channel, and ii) communicating the assigned network address to the first customer premises equipment.

12. A method comprising:
allocating bandwidth in a physical communication link to convey communication data between a network management node and first customer premises equipment, the allocated bandwidth of the physical communication link partitioned based on partitions of wireless bandwidth supported by the first customer premises equipment;
establishing a control channel over the physical communication link between the network management node and the first customer premises equipment,
communicating a command over the control channel from the network management node to the first customer premises equipment, the command controlling operation of the first customer premises equipment;
wherein the partitions of the wireless bandwidth include first wireless bandwidth and second wireless bandwidth; and
wherein allocating the bandwidth includes: i) allocating a first sub-band in the physical communication link, the first sub-band being allocated to convey first data corresponding to the first wireless bandwidth used by the first customer premises equipment to wirelessly communicate with multiple wireless stations; and ii) allocating a second sub-band in the physical communication link, the second sub-band being allocated to convey second data corresponding to the second wireless bandwidth used by the first customer premises equipment to wirelessly communicate with the multiple wireless stations;
wherein the control channel is established in a third sub-band of the physical communication link that does not convey corresponding data associated with the wireless bandwidth used by the first customer premises equipment to communicate with the multiple wireless stations.

13. A system comprising:
a network management node operative to:
allocate bandwidth in a physical communication link to convey communication data associated with first customer premises equipment, the allocated bandwidth partitioned based on wireless bandwidth supported by the first customer premises equipment;
establish a control channel over the physical communication link between the network management node and the first customer premises equipment;
communicate a command over the control channel from the network management node to the first customer premises equipment, the command controlling operation of the first customer premises equipment;
wherein the network management node is further operable to:
allocate a first sub-band in the physical communication link, the first sub-band being allocated to convey data corresponding to first wireless bandwidth used by the first customer premises equipment to wirelessly communicate with multiple wireless stations;
allocate a second sub-band in the physical communication link, the second sub-band being allocated to convey data corresponding to second wireless bandwidth used by the first customer premises equipment to wirelessly communicate with the multiple wireless stations; and
wherein the network management node is further operable to: establish the control channel in a third sub-band that does not convey corresponding data associated with wireless communications supported by the first customer premises equipment.

14. The system as in claim 13, wherein the network management node is further operable to:
in response to communicating the control command, receive a corresponding reply communication from the first customer premises equipment communications over the control channel.

15. The system as in claim 13, wherein the command notifies the first customer premises equipment of a wireless power level at which to transmit wireless communications from the first customer premises equipment.

16. The system as in claim 13, wherein the network management node is further operable to:
establish the control channel over the physical communication link between the network management node and multiple instances of customer premises equipment including the first customer premises equipment and second customer premises equipment.

17. The system as in claim 13, wherein the allocated bandwidth in the physical communication link is allocated to convey data corresponding to a first antenna of the first customer premises equipment.

18. The system as in claim 13, wherein the network management node is further operable to:
allocate the first sub-band in the physical communication link to convey data received over a first antenna of the first customer premises equipment; and
allocate the second sub-band in the physical communication link to convey data received over a second antenna of the first customer premises equipment.

19. The system as in claim 13, wherein the network management node is further operable to:
during establishment of the control channel, communicate access information from the network management node to the first customer premises equipment, the access information providing the first customer premises equipment access to subsequent communications directed from the network management node to the first customer premises equipment.

20. The system as in claim 13, wherein the network management node is further operative to:
implement the control channel via communication of the command in a header associated with a data payload communicated from the network management node to the first customer premises equipment.

21. A method comprising:
allocating bandwidth in a physical communication link to convey communication data between a network management node and first customer premises equipment, the allocated bandwidth of the physical communication link partitioned based on partitions of wireless bandwidth supported by the first customer premises equipment;
establishing a control channel over the physical communication link between the network management node and the first customer premises equipment; and
communicating a command over the control channel from the network management node to the first customer premises equipment, the command controlling operation of the first customer premises equipment;
wherein establishing the control channel includes: establishing the control channel in a sub-band of the physical communication link that is not used to convey data wirelessly transmitted or wirelessly received by the first customer premises equipment via the wireless bandwidth.

22. A method comprising:
allocating bandwidth in a physical communication link to convey communication data between a network management node and first customer premises equipment, the allocated bandwidth of the physical communication link partitioned based on partitions of wireless bandwidth supported by the first customer premises equipment;
establishing a control channel over the physical communication link between the network management node and the first customer premises equipment;
wherein establishing the control channel includes the network management node communicating a network address associated with the control channel to the first customer premises equipment;
communicating a command over the control channel from the network management node to the first customer premises equipment, the command controlling operation of the first customer premises equipment; and
wherein communicating the command over the control channel includes: transmitting the command in a data packet from the network management node over the control channel, the data packet including the network address.

23. The method as in claim 22, wherein the first customer premises equipment is operative to monitor for presence of the network address in communications received from the network management node to detect presence of the command communicated to the first customer premises equipment from the network management node.

24. A method comprising:
allocating bandwidth in a physical communication link to convey communication data between a network management node and first customer premises equipment, the allocated bandwidth of the physical communication link partitioned based on partitions of wireless bandwidth supported by the first customer premises equipment;
establishing a control channel over the physical communication link between the network management node and the first customer premises equipment; and
communicating a command over the control channel from the network management node to the first customer premises equipment, the command controlling operation of the first customer premises equipment;
wherein the first customer premises equipment is operative to frequency up convert communications received from the network management node in a first sub-band over the physical communication link into first communications wirelessly transmitted from the first customer premises equipment in a first portion of the wireless bandwidth; and
wherein the first customer premises equipment is operative to frequency down convert communications wirelessly received over the wireless bandwidth into second communications transmitted from the first customer premises equipment over the first sub-band of the physical communication link to the first customer premises equipment.

25. A method comprising:
allocating bandwidth in a physical communication link to convey communication data between a network management node and first customer premises equipment, the allocated bandwidth of the physical communication link partitioned based on partitions of wireless bandwidth supported by the first customer premises equipment;

establishing a control channel over the physical communication link between the network management node and the first customer premises equipment; and communicating a command over the control channel from the network management node to the first customer premises equipment, the command controlling operation of the first customer premises equipment;

wherein establishing the control channel includes: establishing the control channel in a sub-band of the physical communication link that is not used to convey data transmitted or received by the first customer premises equipment via the wireless bandwidth.

26. A method comprising:

allocating bandwidth in a physical communication link to convey communication data between a network management node and first customer premises equipment, the allocated bandwidth of the physical communication link partitioned based on partitions of wireless bandwidth supported by the first customer premises equipment;

establishing a control channel over the physical communication link between the network management node and the first customer premises equipment;

wherein establishing the control channel includes: establishing the control channel in a sub-band of the physical communication link that is used to convey data transmitted or received by the first customer premises equipment via the wireless bandwidth; and communicating a command over the control channel from the network management node to the first customer premises equipment, the command controlling operation of the first customer premises equipment.

27. A method comprising:

allocating bandwidth in a physical communication link to convey communication data between a network management node and first customer premises equipment, the allocated bandwidth of the physical communication link partitioned based on partitions of wireless bandwidth supported by the first customer premises equipment;

establishing a control channel over the physical communication link between the network management node and the first customer premises equipment, the control channel established over the physical communication link between the network management node and the first customer premises equipment in response to receiving a message from the first customer premises equipment, the message including a first network address assigned to the first customer premises equipment;

wherein establishing the control channel further includes the network management node communicating a second network address to the first customer premises equipment, the second network address assigned to the control channel;

communicating a command over the control channel from the network management node to the first customer premises equipment, the command controlling operation of the first customer premises equipment; and wherein communicating the command over the control channel includes: transmitting the command in a data packet communicated from the network management node over the control channel, the data packet including the second network address as a destination in which to deliver the data packet.

28. A method comprising:

allocating bandwidth in a physical communication link to convey communication data between a network management node and first customer premises equipment, the allocated bandwidth of the physical communication link partitioned based on partitions of wireless bandwidth supported by the first customer premises equipment;

establishing a control channel over the physical communication link between the network management node and the first customer premises equipment; and communicating a command over the control channel from the network management node to the first customer premises equipment, the command controlling operation of the first customer premises equipment;

wherein establishing the control channel includes the network management node communicating: i) a network address associated with the control channel to the first customer premises equipment, and ii) an identity of a sub-band of the physical communication link to the first customer premises equipment, the communicated identity of the sub-band notifying the first customer premises equipment of which of multiple subscriber-bands of the physical communication link to monitor for communications from the network management node.

* * * * *